(12) United States Patent
Schreiner

(10) Patent No.: US 7,048,251 B2
(45) Date of Patent: May 23, 2006

(54) VALVE WITH REMOVABLE ACTUATOR

(75) Inventor: Michael R. Schreiner, Port Washington, WI (US)

(73) Assignee: Caleffi S.p.A., Fontaneto d'Agogna (KM)

(*) Notice: Subject to any disclaimer, the term of this patent is extended or adjusted under 35 U.S.C. 154(b) by 0 days.

(21) Appl. No.: 10/291,155

(22) Filed: Nov. 8, 2002

(65) Prior Publication Data

US 2004/0089835 A1 May 13, 2004

(51) Int. Cl.
*F16K 35/02* (2006.01)

(52) U.S. Cl. .................................. 251/111; 251/291

(58) Field of Classification Search ............... 251/291, 251/89–147
See application file for complete search history.

(56) References Cited

U.S. PATENT DOCUMENTS

| 624,628 | A | | 5/1899 | Corey | |
|---|---|---|---|---|---|
| 1,300,717 | A | | 4/1919 | Fulton | |
| 2,828,102 | A | * | 3/1958 | Larson | .................. 251/66 |

(Continued)

FOREIGN PATENT DOCUMENTS

| BR | 9406973 A | 3/1996 |
|---|---|---|
| DE | 84 07 586 | 5/1984 |
| DE | 90 10 608 | 9/1990 |
| DE | 4321027 A1 | 5/1995 |
| DE | 59405733 D1 | 5/1998 |
| EP | 0750805 A1 | 2/1997 |
| WO | WO 83/00368 | 2/1983 |
| WO | WO 9500998 A1 | 5/1995 |

OTHER PUBLICATIONS

"Gold Series Zone Valves" Information Sheet, Taco, Inc., 1160 Cranston Street, Cranston, RI 02920, Catalog 100–3.3, undated.

"MZV Motorized Zone Valve" Information Sheet, Taco, Inc., 1160 Cranston Street, Cranston, RI 02920, Catalog 100–2.7, undated.

(Continued)

*Primary Examiner*—Ramesh Krishnamurthy
(74) *Attorney, Agent, or Firm*—Joseph S. Henio; Patrick M. Bergin (57) ABSTRACT

A valve assembly includes a valve body and a valve actuator which is releasably engageable with the valve body. The valve body has an internal cavity within which a valve member is located, and a valve stem is interconnected with the valve body and is accessible from the exterior of the valve body. The valve body further includes a mounting member, and the valve actuator is selectively engageable with the mounting member. The valve actuator includes a latch member which is movable between a latching position and a release position. The mounting member includes a slot, and the latch member has a blocking member that is received within the slot when the latch member is in its latching position, to prevent removal of the valve actuator from the valve body. The latch member is manually movable to a release position, in which the blocking member is removed from the slot in the mounting member to enable the valve actuator to be disengaged from the mounting member. The valve actuator includes a motor which drives a gear assembly for selectively imparting rotation to the valve member. The motor is secured to a mounting member such as a mounting plate. The mounting plate includes one or more walls that are exposed to the exterior of the valve actuator, such that heat from operation of the motor is conducted via the mounting plate away from the motor to the one or more walls for dissipation into the surrounding environment.

18 Claims, 6 Drawing Sheets

U.S. PATENT DOCUMENTS

| | | |
|---|---|---|
| 3,206,117 A | 9/1965 | Anderson |
| 3,319,464 A | 5/1967 | Bender |
| 3,319,646 A | 5/1967 | Smulka |
| 3,601,143 A | 8/1971 | Glennon |
| 3,711,060 A | 1/1973 | Weinstein |
| 3,790,122 A | 2/1974 | Weinstein |
| 4,085,952 A | 4/1978 | Sharples |
| 4,239,056 A | 12/1980 | Shope |
| 4,308,886 A | 1/1982 | Handley et al. |
| 4,310,015 A | 1/1982 | Stewart et al. |
| 4,549,446 A | 10/1985 | Beeson |
| 4,562,994 A | 1/1986 | MacDonald |
| 4,593,882 A | 6/1986 | West |
| 4,609,177 A | 9/1986 | Turner et al. |
| 4,705,063 A | 11/1987 | Robinson |
| 4,872,482 A | 10/1989 | Jarrett |
| 5,052,430 A | 10/1991 | Trautwein |
| 5,076,540 A | 12/1991 | Murphy |
| 5,205,534 A | 4/1993 | Giordani |
| 5,257,771 A | 11/1993 | Portis et al. |
| 5,340,078 A | 8/1994 | Dean |
| 5,540,414 A | 7/1996 | Giordani et al. |
| 5,588,637 A | 12/1996 | Carsten et al. |
| 5,731,646 A | 3/1998 | Buhler |
| 6,073,907 A | 6/2000 | Schreiner, Jr. et al. |
| 6,206,024 B1 * | 3/2001 | Naberhaus ............... 137/15.24 |
| 6,236,006 B1 | 5/2001 | Wecke |
| 6,263,903 B1 | 7/2001 | Sjoberg |
| 6,361,019 B1 | 3/2002 | Massey |

OTHER PUBLICATIONS

"Honeywell, V4043, V4044 Fan Coil Valves, V8043, V8044 Zone Valves" Installation Manual, Form No. 95–6983–10, Honeywell, Inc. 1988.

"VG5000 Series Forged Brass Valves 1/2 Through 1 in., Two–Way Normally Closed And Three–Way", Johnson Controls, FANs 977, 125, 1628.3, Product/Technical Bulletin VG5000, Issue Date Nov. 1996.

"Taco Motorized Zone Valve Installation Instructions, 24 VAC Applications" No. 102–064, 1993, Taco, Inc., 1160 Cranston Street, Cranston, RI 02920.

Partial European Patent Search dated Mar. 18, 2004, EP 03 25 7037.

TSE 150 1–10–10 Thermoelectric Actuator 2001.01, Tour & Andersson, 2 pages.

"EMO T—Thermal actuator for heating, ventilation, and air conditioning systems", Theodor Heimeier Metallwerk GmbH & Co., KG, 9 pages.

Click–on® La nouvelle generation d'electrovannes, Norgren Herion, undated.

"Sistema Clip-on—Bobine per valvole solenoidi" Danfoss s.r.l. RB.3J.B1.02, undated.

"Honeywell Zone Valves", A1288 8/90.

* cited by examiner

VALVE WITH REMOVABLE ACTUATOR

BACKGROUND AND SUMMARY OF THE INVENTION

This invention relates to a valve, and more particularly to a valve assembly including a valve body having a movable valve member, and an actuator adapted for engagement with the valve body for providing movement of the valve member within the valve body.

Valves are used in a number of applications to control fluid flow. One type of valve includes a valve body within which a movable valve member is located. The valve body includes an inlet port adapted to communicate with a fluid supply conduit, and an outlet port adapted to communicate with an outlet conduit. Movement of the valve member is operable to open or close the outlet port, to selectively enable fluid flow through the outlet port. In another embodiment, the valve body includes a pair of inlet ports and an outlet port. The valve member is operable to selectively close one of the inlet ports, to enable communication between the outlet port and the open inlet port.

The valve member is mounted to an operating member such as a valve stem, which is pivotably mounted to the valve body. The valve stem is accessible from the exterior of the valve body. The actuator assembly includes a motor and a drive mechanism engaged with the valve stem, such that operation of the motor functions to impart rotation to the valve stem to control the position of the valve member within the interior of the valve body.

The actuator assembly may be either permanently secured to the valve body or releasably engaged with the valve body. Permanent mounting of the actuator to the valve body is disadvantageous in that the entire valve assembly including the valve body must be removed when the actuator assembly requires service or replacement. Releasable engagement of the valve actuator assembly with the valve body has the advantage of enabling the actuator assembly to be freely removed and replaced independent of the valve body, such that the valve body remains in place when the actuator is remover for repair or replacement.

It is an object of the present invention to provide a valve actuator having a number of advantages in construction, operation and assembly over prior art valve actuators. It is a further object of the invention to provide a valve actuator which can be easily engaged with and disengaged from the valve body. It is another object of the invention to provide such a valve actuator which can easily be placed in a proper position relative to the valve body and which ensures a secure connection of the valve actuator to the valve body. Another object of the invention is to provide such a valve actuator which includes an easily operated latch mechanism for engaging the valve actuator with the valve body, and disengaging the valve actuator from the valve body. Yet another object of the invention is to provide such a valve actuator which is relatively simple in its components and construction, yet which enhances operation and assembly of the valve actuator. Yet another object of the invention is to provide such a valve actuator which has a construction that facilitates dissipation of heat from the valve actuator during operation.

In accordance with the present invention, a valve assembly includes a valve body having a valve member with a connector portion, such as a valve stem, accessible from the exterior of the valve body, in combination with a valve actuator which includes a motor and a drive mechanism. The valve actuator is configured so as to be releasably engageable with the valve body, to enable the valve actuator to be engaged with and removed from the valve body. The valve body includes an outwardly extending mounting member, and the valve actuator is releasably engageable with the mounting member so as to provide releasable engagement of the valve actuator with the valve body. The valve actuator includes a latch member which is movable between a latching position and a release position, for selectively enabling the valve actuator to be engaged with the valve body and removed from the valve body. The valve actuator includes a passage within which the mounting member is received. The mounting member includes a slot, and the latch member includes a latching portion having blocking structure that engages the slot when the mounting member is received within the passage, to prevent removal of the valve actuator from the valve body. The latch member is designed such that, when the latch member is in its release position, the blocking structure is removed from engagement with the slot, to enable the valve actuator to be removed from the valve body. The latch member is spring biased toward its latching position, such that the blocking structure normally prevents engagement of the valve actuator with the valve body until the latch member is moved to its release position, which enables the mounting member to be received within the valve actuator passage. The latch member includes an actuator portion which enables the latch member to be moved to its release position via manual engagement by a user. When the user releases engagement with the latch member actuator portion, the spring bias of the latch member returns the latch member to its latching position to secure the valve actuator to the valve body via engagement of the latch member with the mounting member.

The valve actuator includes a gear housing within which one or more drive gears are mounted, including an output gear that is engageable with the operating member. The one or more drive gears are mounted within an internal cavity defined by the housing, and a motor mounting member is configured to overlie at least a portion of the internal cavity. A motor is secured to the motor mounting member, and includes a motor output member that is engageable with the one or more drive gears so as to impart movement to the operating member in response to operation of the one or more drive gears through the motor output member. In one form, the motor mounting member is in the form of a motor mounting plate configured to overlie substantially the entirety of the internal cavity defined by the housing. The motor mounting member includes one or more upstanding walls that are exposed to the exterior of the valve actuator. The motor mounting member is formed of a heat conductive material such as metal, and the one or more upstanding walls function to dissipate heat, generated by operation of the motor, to the exterior of the valve actuator. The valve actuator is preferably releasably engageable with the valve body via a latch mechanism, having a construction as summarized above, incorporated into the gear housing of the valve actuator.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
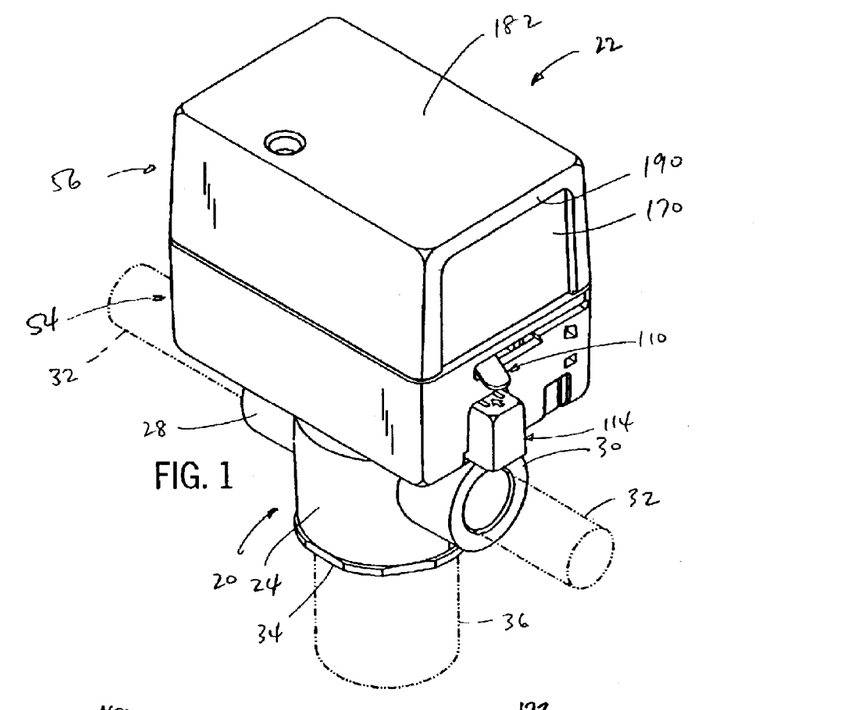
FIG. 1 is an isometric view of a valve assembly, consisting of a valve body and valve actuator, constructed in accordance with the present invention.
Figures 2, 3:
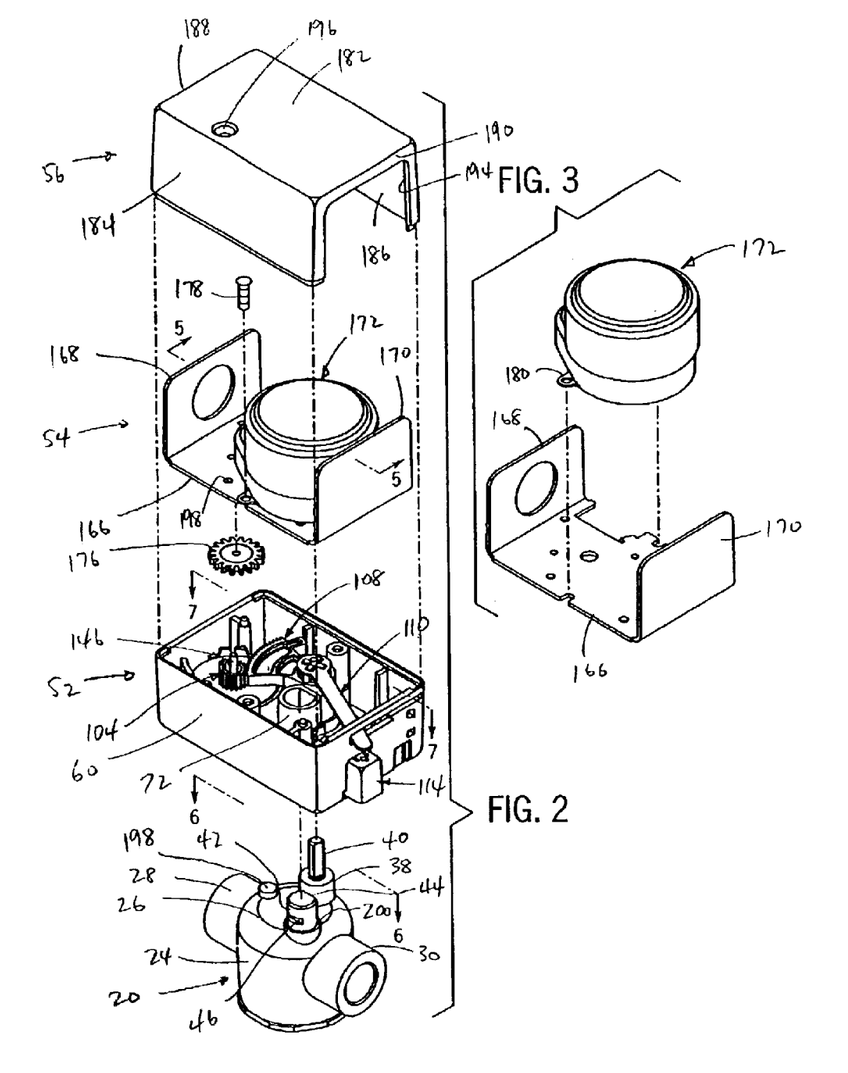
FIG. 2 is an exploded isometric view of the valve body and valve actuator incorporated into the valve assembly of FIG. 1.
FIG. 3 is an exploded isometric view of a motor and motor mounting arrangement incorporated into the valve actuator incorporated into the valve assembly of FIGS. 1 and 2.

Referring to FIGS. 1 and 2, a valve assembly in accordance with the present invention includes a valve body 20 and a valve actuator 22. Valve body 20 includes a peripheral side wall 24 and a domed end wall 26. A pair of nipples 28, 30 are adapted to be plumbed into a fluid flow line, such as shown at 32, which may representatively be a line used in a water-operated heating system or in any other application requiring regulation of fluid flow in a line. In a manner as is known, each nipple defines a passage that communicates with the interior of valve body 20, which defines an internal cavity within which a conventional valve member is received. In a known manner, the valve member is movable between an open position to allow fluid flow in line 32, and a closed position to cut off fluid flow. In the closed position, the valve member is seated against an inside seating surface located in the internal cavity of valve body 20.

In a two-way valve application, an end cap 34 is engaged with the open end of valve body 20, such that opening or closing of the valve member controls fluid communication in line 32. In a three-way valve application, end cap 34 is removed and replaced with a conduit 36, and operation of the valve member functions to control communication between conduit 36 and nipples 28 and 30, and the lines 32 connected to nipples 28 and 30.

Figure 6:
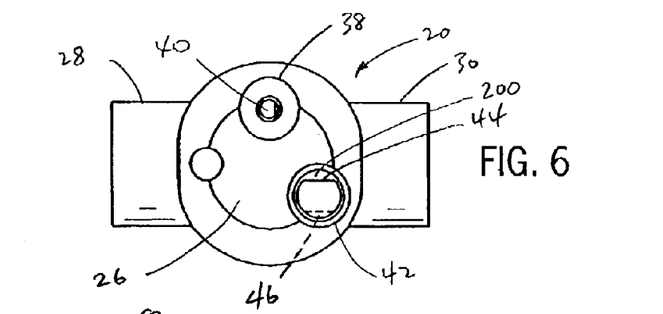
FIG. 6 is a top plan view of the valve body incorporated into the valve assembly of FIGS. 1 and 2, with reference to line 6—6 of FIG. 2.

Referring to FIGS. 2 and 6, valve body 20 includes an outwardly extending boss 38, which defines a passage in communication with the interior of valve body 30. A valve stem 40 extends through the passage defined by boss 38. At its inner end, valve stem 40 is interconnected with the valve member located in the internal cavity defined by valve body 20, in a conventional manner. Valve stem 40 is accessible from the exterior of valve body 20, and is adapted to be engaged with valve actuator 22 in a manner to be explained.

In addition, valve body 20 includes a mounting member, in the form of a mounting post 42, that extends upwardly from end wall 26 at a location spaced from valve stem boss 38 and extending generally parallel to valve stem 40. Mounting post 42 is generally circular, and includes a flat side area 44 (FIG. 6). Mounting post 42 further includes a slot 46 formed in its side surface opposite flat side area 44.

Referring to FIG. 2, valve actuator 22 includes a housing or base section 52, a motor section 54, and a cover 56. In a manner to be explained, valve actuator 22 is releasably engageable with valve body 20, and is operable to selectively move the valve member of valve body 20 between its open and closed positions.

Figure 4:
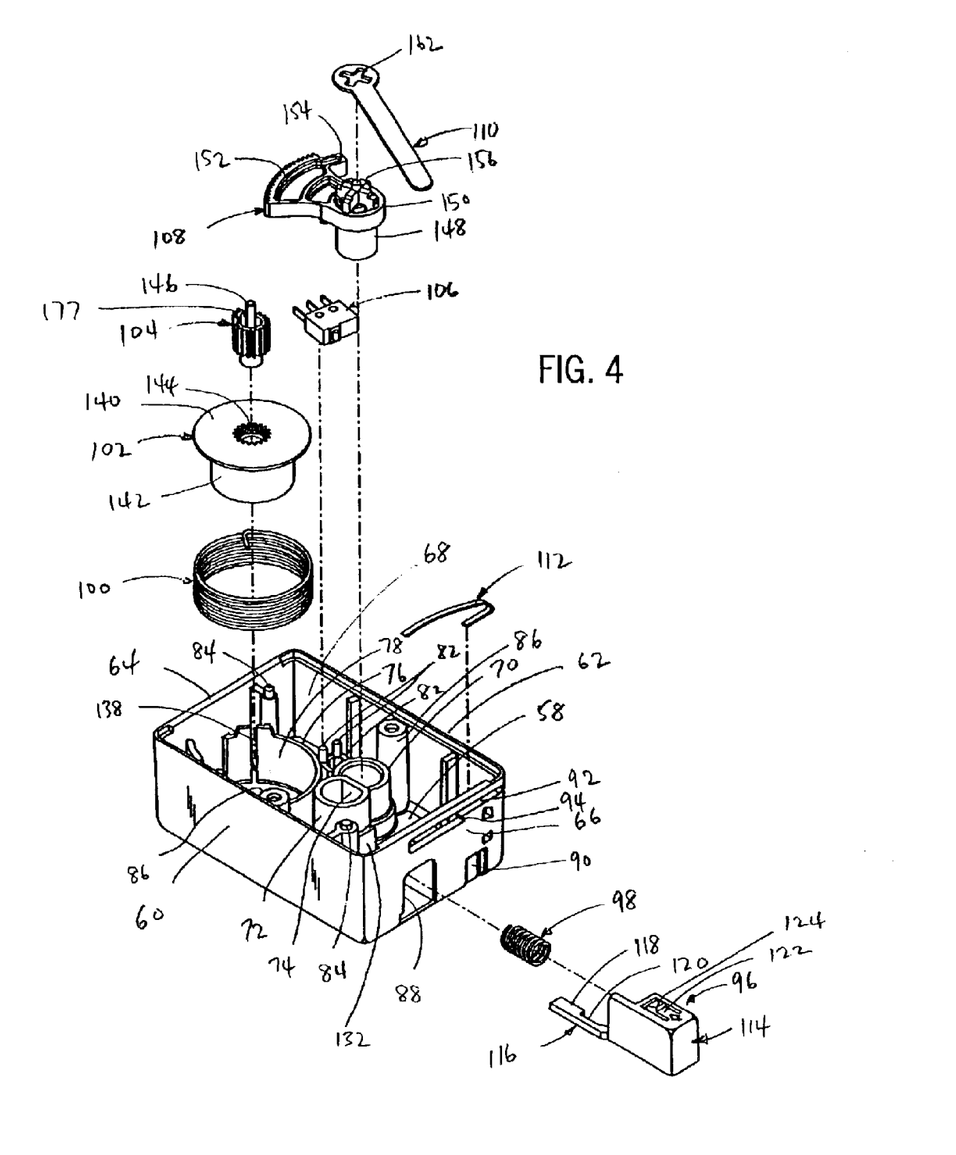
FIG. 4 is an exploded isometric view showing an inner housing member forming a part of the valve actuator incorporated into the valve assembly of FIGS. 1 and 2, and showing the gear and latch member components adapted for mounting thereto.

Referring to FIGS. 2 and 4, base section 52 includes a shell or housing having a bottom wall 58, a pair of side walls 60, 62, and a pair of end walls 64, 66, all of which cooperate to define an internal cavity 68. Base section 52 further includes a tubular gear mounting boss 70 that extends upwardly from bottom wall 58 and defines an internal passage that opens onto the exterior of housing bottom wall 58. A tubular receiver 72 also extends upwardly from housing bottom wall 58. Receiver 72 is generally circular and includes a flat wall 74, which defines a passage having a generally D-shaped cross section that extends through receiver 72 and opens onto the exterior of bottom wall 58.

Base section 52 further includes an arcuate wall 76 that extends upwardly from bottom wall 58. Arcuate wall 76 defines a pinion housing cavity 78, which is closed at its lower end by bottom wall 58. A controller mounting member 80, which includes a pair of studs 82, extends upwardly from housing bottom wall 58. Base section 52 further includes locating pins 84 that extend upwardly from bosses formed integrally with side wall 60 and end wall 64, as well as bosses 86 formed integrally with side walls 60, 62 that define upwardly facing threaded passages.

End wall 66 of base section 52 includes an opening 88, as well as an indentation 90 spaced from opening 88. A transverse slot 92 is formed in end wall 66 above opening 88 and indentation 90, and includes an enlarged inner area forming an angled shoulder 94.

A series of components are engaged with the shell or housing of base section 52 described above. With reference to FIG. 4, such components include a latch member 96 and a latch member spring 98, a torsion spring 100, a pinion housing 102 adapted to mount a pinion 104, an optional auxiliary or end switch 106, a sector gear 108, a manual override lever 110, and a leaf spring 112.

Latch member 96 includes an outer actuator portion 114 and an inwardly extending latch arm 116 which includes a blocking member 118 at its end. A recess 120 is located between blocking member 118 and the rear end of actuator portion 114. The top wall of actuator portion 114 is formed with a resilient finger 122 having an outwardly extending tang 124. In assembly, the outer end of spring 98 is first engaged with the rear wall of outer actuator portion 114, shown at 126, such as by engagement with a rearwardly extending boss formed integrally with rear wall 126 that extends into the passage defined by spring 98. Latch member 96, with spring 98 mounted thereto, is then inserted through opening 88 in end wall 66 of base section 52. A pair of guide walls 128, 130 extend inwardly from the inside surface of end wall 66, and are configured to match the cross section of actuator portion 114 so as to facilitate inward and outward movement of actuator portion 114 relative to end wall 66. As latch member 96 is engaged within opening 88 in this manner, tang 124 comes into contact with the upper edge of end wall 66, which functions to deflect finger 122 inwardly. Upon continued inward movement of actuator portion 114, tang 124 clears the inside surface of end wall 66 and finger 122 is moved outwardly under the influence of its outward bias, to return tang 124 to its original position. The outer lip of tang 124 is thus located above the upper edge of opening 88, to interfere with the material of end wall 66 defining opening 88 so as to maintain latch member 96 in engagement with base section 52. The inner end of spring 98 bears against a spring bearing surface 132 (FIG. 4) defined by receiver 72. Spring 98 has a length and configuration which functions to bias latch member 96 outwardly in the direction of the arrow shown in FIG. 8, in which latch member 96 is placed in a latching position (in a manner to be explained), and in which tang 124 engages the inside surface of end wall 66 so as to maintain latch member 96 in engagement with base section 52.

Figure 7:
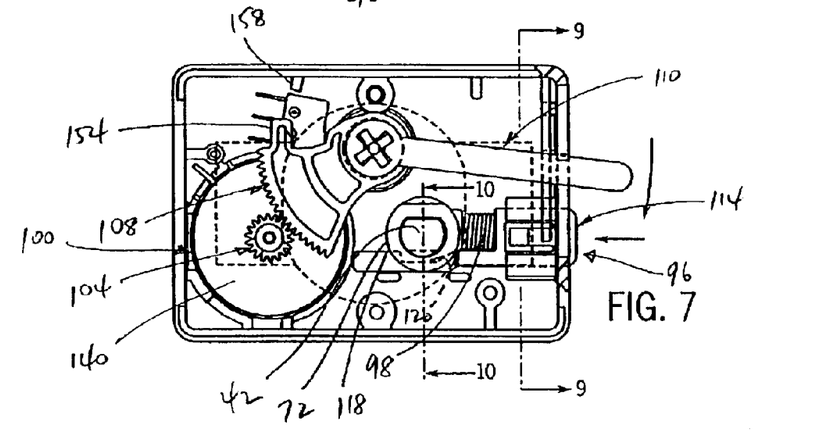
FIG. 7 is a top plan view of the inner housing and the gear and latch components mounted thereto, with reference to line 7—7 of FIG. 2, showing the latch member in its release position.
Figure 8:
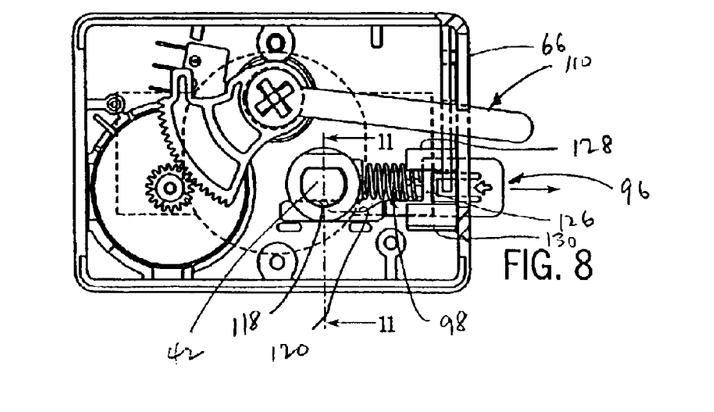
FIG. 8 is a view similar to FIG. 7, showing the latch member in its latching position.
Figure 9:
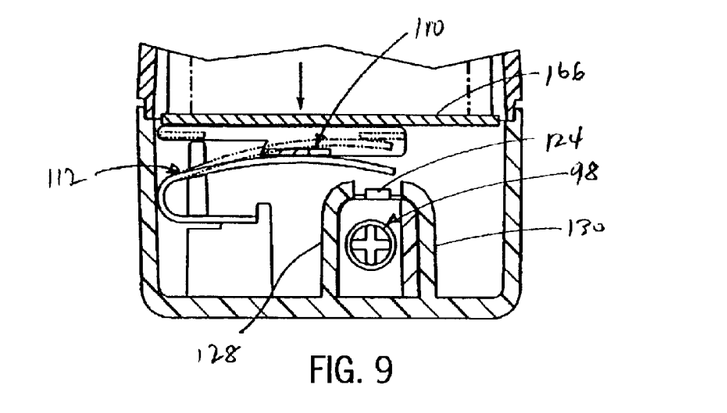
FIG. 9 is a section view taken along line 9—9 of FIG. 7.
Figure 10:
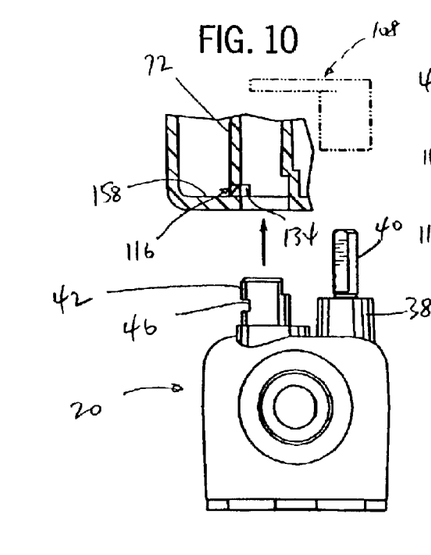
FIG. 10 is a partial section view taken along line 10—10 of FIG. 7.
Figure 11:
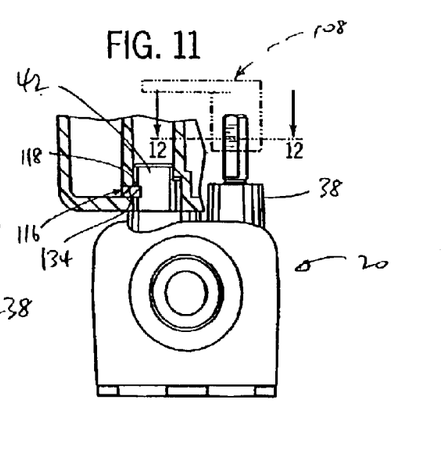
FIG. 11 is a partial section view taken along line 11—11 of FIG. 8.

As shown in FIGS. 10 and 11, receiver 72 includes a slot 134 adjacent the upwardly facing surface of bottom wall 58. Latch arm 116 of latch member 96 is received within slot 134. Latch member 96 is movable between a latching position and a release position, by movement of latch member 96 outwardly and inwardly, respectively, relative to base section end wall 66. When latch member 96 is moved outwardly to the latching position as shown in FIGS. 8 and 11, blocking member 118 of latch arm 116 extends through slot 134 and into the passage defined by receiver 72. When latch member 96 is moved inwardly to the release position as shown in FIGS. 7 and 10, the area of latch arm 116 adjacent recess 120 is received within slot 134. Recess 120 is configured so as not to extend into the passage of receiver 72 when latch member 96 is in the release position.

Also in assembly, torsion spring 100 is placed into pinion housing cavity 78. One end of torsion spring 100, e.g. its lower end, includes an outwardly extending end portion that is received within a slot, shown at 138, defined by arcuate wall 76 so as to fix the end of torsion spring 100 in position. Pinion housing 102 includes an upper disc portion 140 and a lower annular side wall 142 extending downwardly from upper disc portion 140. A slot is formed in side wall 142, and is adapted to receive an inwardly extending end portion formed at the upper end of torsion spring 100, so as to engage torsion spring 100 with pinion housing 102. Pinion housing 102 includes an annular toothed recess 144 at its center, which is configured so as to mate with the lower end of pinion 104. Recess 144 terminates in an upwardly facing shoulder which engages a downwardly facing edge defined by the gear teeth of pinion 104, to fix the axial position of pinion 104 relative to pinion housing 102. Pinion 104 includes an upwardly extending center pin 146. After assembly of torsion spring 100, pinion housing 102 and pinion 104 into pinion housing cavity 78, as shown in FIG. 2, torsion spring 100 is wound to a predetermined torque in a known manner, such as via a manufacturing fixture which accesses pinion housing 102 from an opening formed in bottom wall 58.

Sector gear 108 includes a mounting hub 148, and a sector gear body including a central section 150 and an arcuate outer edge 152 in which a series of outwardly facing gear teeth are formed. A stop lug 154 extends from one side of the sector gear body, and an X-shaped boss 156 extends upwardly from central section 150. Sector gear 108 is assembled after the predetermined torque is applied to torsion spring 100, by inserting sector gear hub 148 into the upwardly open passage defined by gear mounting boss 70. The teeth of sector gear outer edge 152 are engaged with the teeth of pinion 104. With this arrangement, sector gear 108 is pivotable about a pivot axis defined by the longitudinal axis of hub 148, which is coincident with the longitudinal axis of gear mounting boss 70. Stop lug 154 is selectively engageable with a stop rib 158 that extends inwardly from base section side wall 62, to selectively stop rotation of sector gear 108 in a clockwise direction (with reference to FIGS. 7, 8, 13 and 14).

Figure 12:
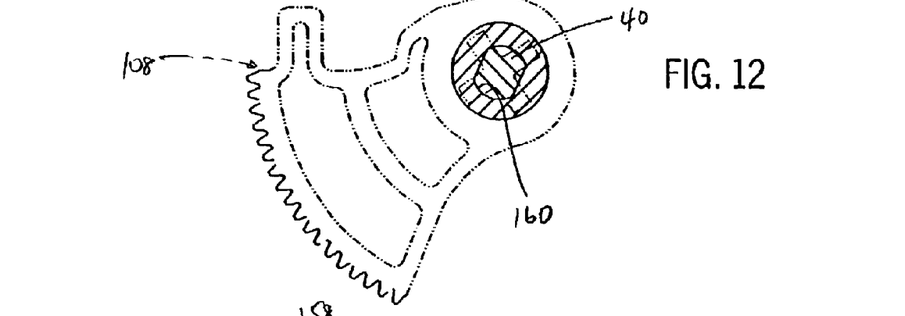
FIG. 12 is a partial section view taken along line 12—12 of FIG. 11.
Figure 13:
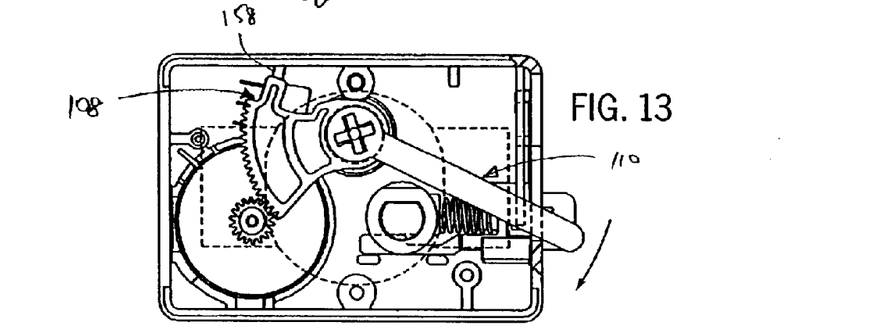
FIGS. 13 and 14 are views similar to FIG. 8, showing operation of a manually engageable lever incorporated into the valve assembly of FIG. 1 for moving the valve between its open and closed positions.
Figure 14:
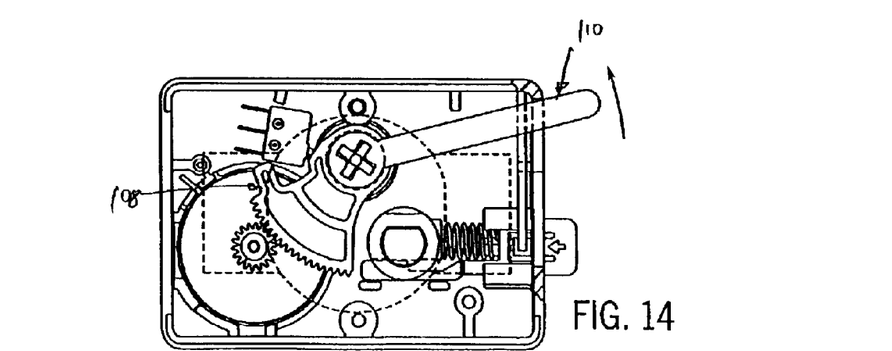

As shown in FIG. 12, sector gear hub 148 includes a downwardly facing internal passage 160 having a cross sectional configuration which matches that of valve stem 40.

To complete assembly of base section 52, manual open lever 110 is engaged with sector gear 108 via an X-shaped opening 162 which receives X-shaped boss 156 at the central section of sector gear 108. Lever 110 extends outwardly through slot 92 in end wall 66 of base section 52. Wire form spring 112 is engaged with an upper edge defined by indentation 90, and bears against the downwardly facing surface of lever 110 for providing an upward bias on lever 110. Auxiliary switch 106 is assembled to mounting studs 82 via a pair of spaced apart passages formed in the body of auxiliary switch 106.

Figure 5:
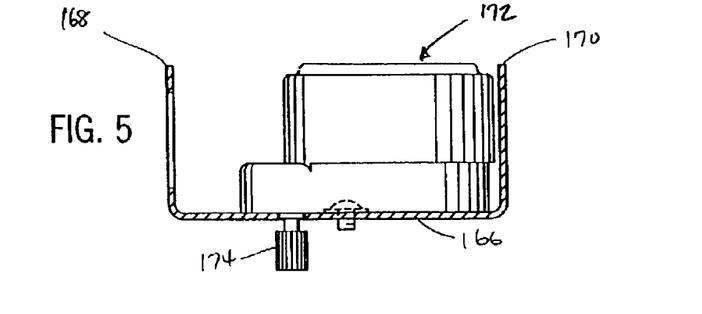
FIG. 5 is a partial section view taken along line 5—5 of FIG. 2.

Referring to FIGS. 2 and 3, motor section 54 of valve actuator 22 includes a motor mounting member, in the form of a mounting plate 166 having upwardly extending walls 168, 170 at its opposite ends. A motor 172 is adapted for engagement with mounting plate 166. Motor 172 includes an output drive gear 174 (FIG. 5), which engages the gear teeth of a lost motion gear 176 that is engaged with pin 146 which extends upwardly from pinion 104. Pinion 104 includes an upstanding tab 177 (FIG. 4) which is received within an arcuate recess formed in the underside of lost motion gear 176

In assembly, mounting plate 166 of motor section 54 is engaged with base section 52, so as to substantially enclose the open upper end of internal cavity 68. Mounting plate 166 includes a series of holes and openings that mate with the various locating pins, such as 84, as well as which receive the upper ends of pinion pin 146 and a pin extending upwardly from X-shaped boss 156 of sector gear central section 150. Fasteners, such as screws 178, are inserted through openings in mounting tabs, such as 180, associated with the housing of motor 172, so as to secure mounting plate 166 and motor 172 together to base section 52. In this manner, mounting plate 166 functions to simultaneously enclose the internal cavity of base section 52, and to retain various components such as sector gear 108, pinion 104 (and pinion housing 102) and manual lever 110 in position within the internal cavity of base section 52, as well as to mount motor 172 to base section 52.

In a preferred form, mounting plate 166 and upwardly extending walls 168, 170 are formed integrally together of a heat-conductive material, such as a metallic material which is stamped to a desired shape and bent to the configuration as shown.

Cover 56 includes a top wall 182, a pair of side walls 184, 186, and a pair of end walls 188, 190, which are formed with downwardly facing recesses 192, 194, respectively. Cover 56 is assembled after motor section 54 is secured to base section 52. Upstanding wall 168 of motor mounting member 166 is received within recess 192 in end wall 188, and upstanding wall 170 is received within recess 194 in end wall 190. Side walls 184, 186 function to enclose motor 172 between upstanding walls 168, 170. A screw or the like extends through an opening 196 in top wall 182 for engagement with a threaded opening, such as 198, formed in mounting plate 166 so as to secure cover 56 in position and to form the assembled valve actuator at 22 as shown in FIG. 1.

To install valve actuator 22 on valve body 20, the user manually engages outer actuator portion 114 of latch member 96, and applies an inward force to latch member 96 so as to move latch member 96 from its engaged position of FIG. 8 to its release position of FIG. 7, against the bias of spring 98. When latch member 96 is placed in its release position in this manner, recess 120 of latch arm 116 is located in receiver slot 134, such that latch arm 116 does not interfere with the passage of receiver 72. The user then engages valve stem 40 within passage 160 defined by sector gear hub 148, and aligns valve actuator 22 relative to valve body 20 by placing flat wall 74 of receiver 72 into alignment with flat side area 44 of valve body mounting post 42. While continuing to maintain latch member 96 in its release position by manual engagement with outer actuator portion 114 of latch member 96, the user moves valve actuator 22 toward valve body 20 in a direction parallel to the longitudinal axes of mounting post 42 and valve stem 40. Such movement of valve actuator 22 functions to continue movement of valve stem 40 into passage 160 in sector gear hub 148, and movement of mounting post 42 into the passage of receiver 72. When valve actuator 22 is fully engaged with valve body 20 in this manner, the lower surface of bottom wall 58 engages a stop member, shown at 198, defined by valve body 20, as well as an upwardly facing shoulder, shown at 200, defined by valve stem mounting post 42. The user then releases the manual engagement of outer actuator portion 114 of latch member 96, and spring 98 extends so as to place latch member 96 in its engaged position, as shown in FIG. 8. When latch member 96 is in its engaged position, blocking member 118 of latch arm 116 is received within slot 46 in mounting post 42. When latch member 96 is placed in its latching position in this manner, engagement of blocking member 118 within slot 46 prevents valve actuator 22 from being removed from valve body 20.

To remove valve actuator 22 from valve body 20, the user reverses the above steps, and manually engages outer actuator portion 114 to move latch member 96 to its release position. Such movement of latch member 96 functions to move blocking member 118 out of engagement within slot 46, to enable removal of valve actuator 22 from valve body 20.

When valve actuator 22 is installed on valve body 20, operation of valve actuator 22 is generally the same as in the prior art so as to provide movement of the valve member of valve body 20. Motor 172 is operated to impart movement to sector gear 108 through lost motion gear 176, by engagement of pinion gear tab 177 with the end of the slot in lost motion gear 176. When the valve member is moved to the closed position, tab 177 stops when the valve member is seated and lost motion gear 176 continues to move as motor 172 is allowed to coast to a stop, due to the arcuate slot in the underside of lost motion gear 176 within which tab 177 is received. Torsion spring 100 functions to apply a normally open or normally closed bias, by urging pinion housing 102 in either a clockwise or counterclockwise direction, according to the desired operation of the actuator. In a two-way valve, stop lug 154 engages stop rib 158 to control the range of movement of the valve member in one direction, and internal engagement of the valve member with the valve seat controls movement of the valve member in the opposite direction. In a three-way valve, internal engagement of the valve member with the valve seats controls movement of the valve in both directions. When installed, auxiliary switch 106 functions to initiate operation of a circulating pump or a control system for controlling operation of a series of pumps, in response to initiation of operation of valve actuator 22

In operation, heat generated by motor 172 is transferred to motor mounting plate 166 by virtue of the direct engagement of motor 172 with motor mounting plate 166. Because upstanding walls 168 and 170 are formed integrally with motor mounting plate 166 and are exposed to the exterior of valve actuator 22, heat applied to motor mounting plate 166 by motor 172 is conducted to upstanding walls 168, 170, which function to transfer and dissipate heat to the surrounding environment. Upstanding walls 168, 170 thus function to draw heat away from motor 172 through motor mounting plate 166, and to radiate heat away from motor 172 to prevent overheating.

While the invention has been described with respect to a specific embodiment, it is contemplated that various alternatives and modifications are possible and contemplated as being within the scope of the present invention. For example, and without limitation, while motor mounting plate 166 is shown and described as covering substantially the entirety of internal cavity 68 of base section 52, it is also contemplated that the components of base section 52 may be enclosed by a structure other than motor mounting plate 166. Further, while latch member 96 is shown and described as having a specific construction which provides axial movement between its latching and release positions, it is also contemplated that latch member 96 may move in a pivoting fashion between its latching and release positions. Further, while slot 46 is illustrated as extending parallel to flat wall 74 of receiver 72, it is also contemplated that slot 46 may be perpendicular to flat wall 74 or oriented at an acute or obtuse angle relative to flat wall 74. Further, it is also considered that the structure within which the blocking member 118 is received may have a configuration other than a slot-type configuration, so long as it provides a shoulder or similar surface with which the blocking member is engageable for preventing removal of valve actuator 22 from valve body 20 when latch member 96 is in its latching position.

Various alternatives and embodiments are contemplated as being within the scope of the following claims particularly pointing out and distinctly claiming the subject matter regarded as the invention.

I claim:

1. A valve assembly comprising:
    a valve body defining an internal passage and including a valve member for controlling flow of fluid through the passage, wherein the valve member is mounted to an operating member movably mounted to the valve body for providing movement of the valve member, wherein the operating member includes an axially extending connector portion accessible from the exterior of the valve body;
    an actuator assembly including a motor having an output and a drive mechanism; and
    a removable connection arrangement interposed between the valve body and the actuator assembly for providing removable interconnection of the actuator assembly with the valve body, wherein the removable connection arrangement includes an axial movable latch member associated with the actuator assembly, wherein the latch member is axially movable between an engaged position and a release position, and engagement structure associate with the valve body, the engagement structure of the valve body comprising a slot and wherein the latch member in its engaged position includes a locking section disposed within the slot so as to prevent removal of the actuator assembly from the valve body, the latch member further including an actuator arrangement operable to place the the latch member in its release position, in which the latch member is disengageable from the engagement structure associated with the valve body, and in its engaged position, in which the latch member is engaged with the engagement structure associated with the valve body;

wherein, when the actuator assembly is connected to the valve body, the actuator assembly drive mechanism is interconnected with the connector portion of the operating member for providing movement of the operating member, and thereby movement of the valve member, in response to operation of the motor; and wherein the latch member is constructed and arranged such that, when the latch member is in its engaged position, the latch member functions to prevent engagement of the actuator assembly with the engagement structure associated with the valve body when the actuator assembly is removed from engagement with the valve body, and to prevent removal of the actuator assembly from the valve body when the actuator assembly is engaged with the valve body.

2. The valve assembly of claim 1, wherein the actuator arrangement comprises a manually operable actuator member, wherein the actuator member is manually engageable by a user so as to move the latch member between its engaged position and its release position.

3. The valve assembly of claim 2, wherein the actuator member is configured so as to be accessible from an exterior defined by the actuator assembly.

4. The valve assembly of claim 3, wherein the valve body includes an outwardly extending mounting member and wherein the actuator arrangement includes a housing defining a passage within which the outwardly extending mounting member is received, wherein the slot is formed in the outwardly extending mounting member of the valve body.

5. The valve assembly of claim 4, wherein the mounting member and the actuator member passage each define a mating non-circular cross section to provide engagement of the actuator housing with the valve body in a predetermined orientation.

6. The valve assembly of claim 4, wherein the axially extending connector portion of the operating member extends outwardly from the valve body at a location spaced from the mounting member.

7. The valve assembly of claim 4, wherein the latch member includes a blocking portion and a release portion, wherein, when the latch member is in its engaged position, the blocking portion is located within the passage to prevent removal of the actuator assembly from the valve body via engagement of the blocking portion within the slot and to prevent engagement of the actuator assembly with the valve body via engagement of the blocking portion with the mounting member when the actuator assembly is disengaged from the valve body, and wherein, when the latch member is in its release position, the release portion of the latch member is located adjacent the passage, wherein the release portion is configured so as not to interfere with the passage and to enable the mounting member to be moved into and removed from the passage to provide engagement and disengagement of the actuator assembly to and from the valve body.

8. The valve assembly of claim 7, wherein the release portion of the latch member comprises a recess associated with the latch member.

9. The valve assembly of claim 1, wherein the valve body and actuator assembly further comprise: a gear housing defining an internal cavity, within which one or more drive gears are movably mounted, wherein the one or more drive gears include an output drive gear adapted for engagement with the operating member; a motor mounting member configured to overlie at least a portion of the gear housing internal cavity; and a motor secured to the motor mounting member, wherein the motor includes an output member adapted for engagement with one of the drive gears for imparting movement to the operating member through the output drive gear.

10. The valve assembly of claim 9, wherein the motor mounting member is configured to generally enclose the internal cavity.

11. The valve assembly of claim 10, wherein the motor mounting member includes a mounting wall to which the motor is secured and which is configured to generally enclose the internal cavity of the gear housing, and at least one outwardly extending wall extending from the mounting wall, wherein the outwardly extending wall is exposed to the exterior of the valve actuator for dissipating heat generated by operation of the motor.

12. The valve assembly of claim 11, wherein the mounting wall and the outwardly extending wall are formed of a metallic material for facilitating the conduction of heat from the mounting wall to the outwardly extending wall.

13. The valve assembly of claim 11, wherein the motor mounting member includes a pair of outwardly extending walls extending from the motor mounting wall.

14. The valve assembly of claim 11, further comprising a cover member configured to enclose the motor and the motor mounting member, wherein the cover member includes an open area through which the outwardly extending wall of the motor mounting member is exposed to the exterior of the valve actuator.

15. The valve assembly of claim 9, wherein the valve actuator is adapted for releasable engagement with the valve body, wherein the valve body includes an actuator mounting member and wherein the gear housing includes a movable latch member that is movable between an engaged position in which the latch member is engaged with the actuator mounting member for securing the valve actuator to the valve body via engagement with the actuator mounting member, and a release position in which the latch member enables the valve actuator to be moved into and out of engagement with the actuator mounting member.

16. The valve assembly of claim 15, wherein the actuator mounting member comprises a mounting post extending outwardly from the valve body, wherein the mounting post includes a slot, and wherein the gear housing defines a passage adapted to receive the mounting post, wherein the latch member include a manually engageable actuator portion exposed to the exterior of the gear housing, and a latching portion including blocking structure positioned within the passage when the latch member is in its engaged position, wherein the blocking structure is received within the slot in the mounting post for preventing removal of the valve actuator from the valve body, and further includes a recess adapted to be aligned with the passage so as to release engagement with the mounting post slot to enable the valve actuator to be removed from engagement with the mounting post.

17. The valve assembly of claim 16, further comprising a spring for biasing the latch member toward its engaged position, wherein the actuator portion of the latch member is adapted for manual engagement by a user for placing the latch member in its release position prior to engagement of the valve actuator with the mounting post so as to enable the mounting post to be received within the passage, and wherein release of the actuator portion of the latch member functions to enable the latch member to be moved to its latching position under the influence of the spring so as to secure the valve actuator to the mounting post.

18. A method of assembling a valve, wherein the valve includes a valve body, a mounting member associated with the valve body, the valve body also including a valve member and an operating member interconnected with the valve member, wherein the operating member is accessible from the exterior of the valve body, comprising the steps of:

providing an actuator assembly, wherein the actuator assembly includes a motor having an output and a drive mechanism, and a manually operable latch member, the latch member being axially movable between an engaged position and a release position;

manually operating the latch member to place the latch member in the release position, the step of manually operating the latch member to place it in its release position being carried out under the influence of a spring which functions to move the latch member to its release position when the latch member is released;

engaging the actuator assembly with the valve body by positioning the valve body such that the mounting member associated with the valve body is received within a passage associated with the actuator assembly, and wherein the step of moving the latch member to its engaged position is operable to engage blocking structure associated with the latch member within a slot defined by the mounting member, wherein the blocking structure and slot are configured to prevent removal of the actuator assembly from the valve body when the latch member is in its engaged position so as to maintain the actuator assembly in engagement with the valve body;

moving the latch member to the engaged position subsequent to engagement of the actuator assembly with the valve body, wherein the latch member includes latch structure engaged within a receiver associated with the valve body when the latch member is in the engaged position to maintain the actuator assembly in engagement with the valve body.

* * * * *

UNITED STATES PATENT AND TRADEMARK OFFICE
CERTIFICATE OF CORRECTION

| | | |
|---|---|---|
| PATENT NO. | : 7,048,251 B2 | |
| APPLICATION NO. | : 10/291155 | |
| DATED | : May 23, 2006 | |
| INVENTOR(S) | : Michael R. Schreiner | |

It is certified that error appears in the above-identified patent and that said Letters Patent is hereby corrected as shown below:

At Col. 12, line 6 the word "release" should be replaced with the word --engaged--.

Signed and Sealed this

Twenty-third Day of September, 2008

JON W. DUDAS
*Director of the United States Patent and Trademark Office*